Jan. 11, 1949. M. WOEHREL 2,458,757
STERILIZER FOR BARBER SHOPS AND BEAUTY PARLORS
Filed June 23, 1947 2 Sheets-Sheet 1
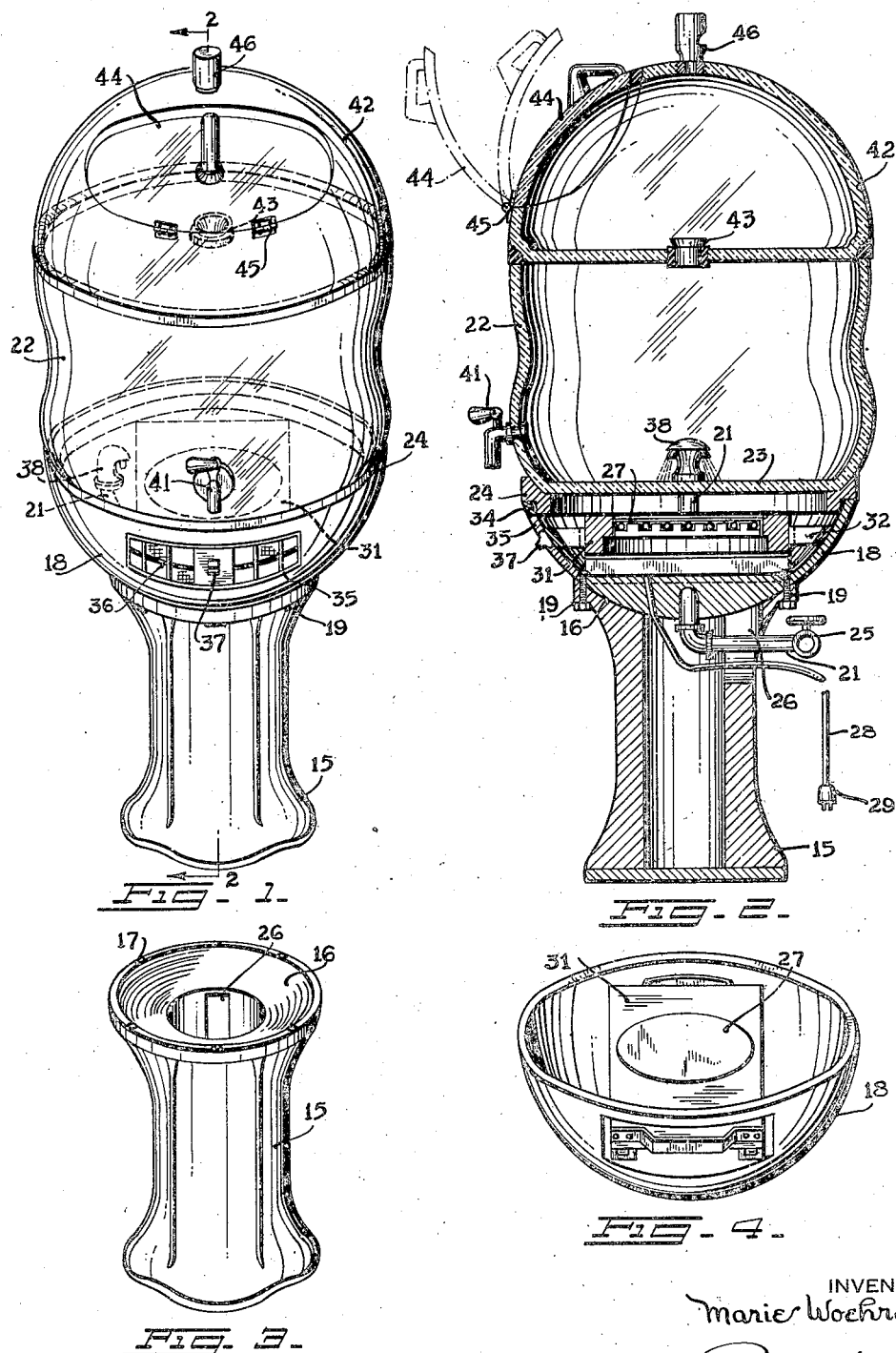
INVENTOR.
Marie Woehrel
BY
ATTORNEYS.

Jan. 11, 1949.                  M. WOEHREL                   2,458,757
               STERILIZER FOR BARBER SHOPS AND BEAUTY PARLORS
Filed June 23, 1947                                      2 Sheets-Sheet 2

INVENTOR.
Marie Woehrel
BY
ATTORNEYS.

Patented Jan. 11, 1949

2,458,757

UNITED STATES PATENT OFFICE 2,458,757

STERILIZER FOR BARBER SHOPS AND BEAUTY PARLORS

Marie Woehrel, New York, N. Y.

Application June 23, 1947, Serial No. 756,357

8 Claims. (Cl. 21—81)

This invention relates to a steam sterilizer for use in barber shops and beauty parlors.

It is an object of the present invention to provide a towel sterilizer for use in barber shops and beauty parlors which can be heated by electricity by simply inserting a plug in a wall receptacle and wherein the parts are stacked one above the other so that access can be had to the electric element and to the interior of the sterilizer for the purpose of effecting a cleaning operation upon the same.

It is another object of the present invention to provide a steam container for the towels with means whereby the towels can be withdrawn from the same without the necessity of the person extending their hands or arms to any great extent in the interior of the steam casing.

Other objects of the present invention are to provide a steam sterilizer for use in barber shops and beauty parlors which is of simple construction, inexpensive to manufacture and efficient in operation and wherein broken parts can be easily fixed thereto without the complete disassembly of the sterilizer.

According to the present invention, there is provided a pedestal on which a plurality of parts are stacked one above the other. Each of these parts is properly designed to support the part above it and the parts therein are so shaped and arranged as to permit fanciful designs upon them so as to attract attention to the sterilizer. Separate parts are provided respectively for the electric heater, the hot water, and the steam compartment housing the towels. Within the towel compartment, there is provided an adjustable plate which can be rotated to advance the towels to the opening where they will be more readily accessible to the operator.

According to a modified form of the invention, the cover may include the bottom of the steam receptacle which, when tilted downwardly, will permit the towels to be rolled outwardly whereby they will be more accessible to the operator. Upon returning the cover to its original position, the towels will be rolled onto the bottom and across the extent thereof.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of the steam sterilizer.

Fig. 2 is a cross sectional view, in elevation, taken on line 2—2 of Fig. 1.

Fig. 3 is a perspective view of the pedestal or base.

Fig. 4 is a perspective view of the heater element part.

Figure 7:
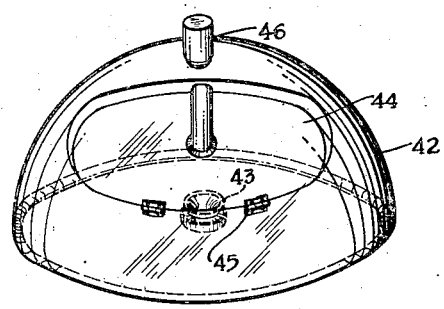
Fig. 7 is a perspective view of the towel receptacle or steam compartment.

Referring now to the figures, 15 represents a pedestal which may rest on a shelf in a barber shop or beauty parlor. The top of the pedestal is hollowed out as indicated at 16 at the top and has a plurality of bosses 17 for receiving screws by which a heater part 18 may be secured to the top of the pedestal. These screws are indicated at 19 in Fig. 2.

The heater part 18 has a pipe 21 entering the same which extends upwardly so as to pass through the bottom 23 of a water receptacle 22 so as to supply water to the receptacle 22. The receptacle 22 rests upon a ring 24 on the top of the part 18. The pipe 21 has a valve 25 therein for controlling the flow of water and this pipe extends through an opening 26 in the side of the pedestal 15 and then upwardly through the center of the pedestal and through the part 18.

Within the part 18 is a heater element 27 adapted to be supplied with current through a wire 28 having a plug 29 adapted to fit a wall receptacle. The heater element 27 is supported upon a member 31 having projections 32 thereon for engaging with the rounded interior surface of the part 18 to support the same therebetween.

On the side of the part 18 is an opening 34 which is closed by a plate 35 having windows 36 therein and a snap switch 37 for turning on and off the heater element 27.

Within the part 22 is a water outlet fitting 38 for the pipe 21. This fitting is tightly secured to the bottom of the part 22 to prevent leakage. Also on the part 22 is an outlet spigot 41 from which hot water can be drawn off.

The top of the part 22 is open to receive a steam vessel 42 having an opening 43 in its bottom through which the steam penetrates and enters the vessel 42 for engagement with towels therein which are to be sterilized. The towels rest upon the bottom of the vessel 42.

The vessel 42 can be removed from the part 22 to provide access to the hot water within the part 22 because, at times, it may be desired to boil the towels in the hot water, this can be readily done by removing the vessel 42. In the side of the vessel 42 is a cover 44 which is hinged at its lower edge as indicated at 45 and which is pulled downwardly to permit the operator to extend his hand into the vessel 42 to remove the towel. Thereafter when steam is being extending into the vessel 42, the cover 44 is brought to the closed position.

On the top of the vessel 42 is a whistle 46 which will blow when a sufficient amount of steam has been extended into the vessel 42. These parts can be made of glass or other material and can be transparent so that the number of towels within the vessel and the water in the part 22 can be observed.

Figure 8:
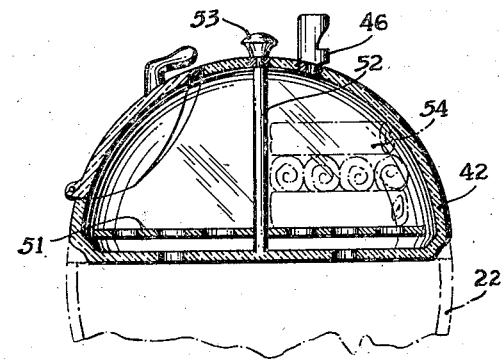
Fig. 8 is a cross sectional view taken through the steam compartment showing a means therein for moving the towels therearound so that they will be advanced toward the opening through which they are extracted.
Figure 6:
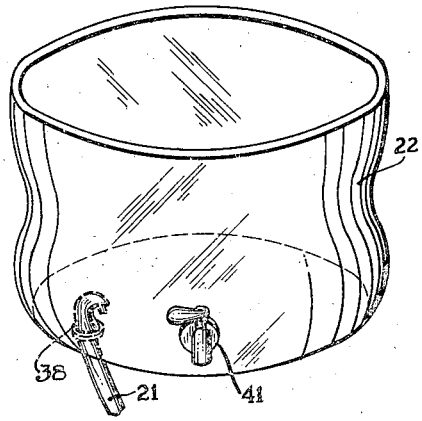
Fig. 6 is a perspective view of the water containing receptacle.

In Fig. 8, there is provided a perforated plate 51 which is supported upon a shaft 52 which extends upwardly through the top of the vessel and which has a handle 53 which when turned will cause the rotation of the plate 51 which carries towels 54 so that these towels may be brought about to be accessible through the cover opening at the left side.

The shaft 52 extends through the plate 51 and its end is rested upon the bottom of the vessel 42.

Figure 9:
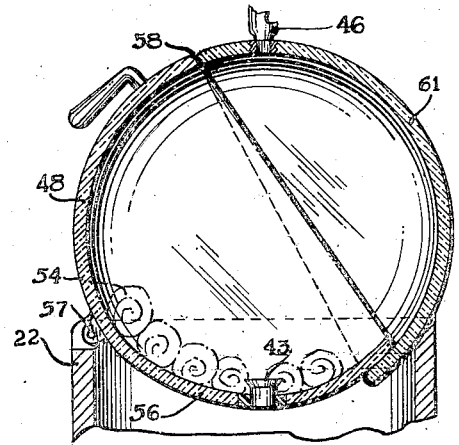
Fig. 9 is a cross sectional view taken through a modified form of steam compartment wherein the bottom is attached to the cover and upon rotation of the cover the towels are rolled from the bottom onto the cover.
Figure 5:
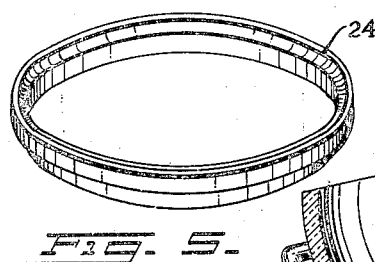
Fig. 5 is a perspective view of the ring adapted to be fitted on the top of the heater element part.
Figure 10:
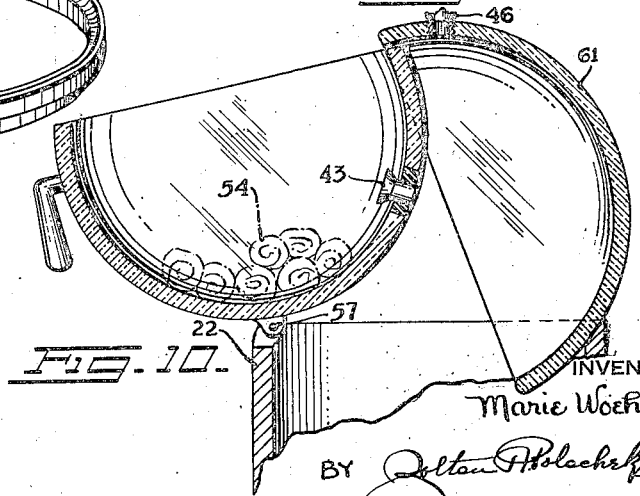
Fig. 10 is a view similar to Fig. 8 wherein the cover and bottom have been drawn outwardly to provide access to the towels.

In Figs. 9 and 10, there is shown a modified form of steam vessel. According to this form, the vessel is made a part of the cover so that its bottom is tilted outwardly when the handle on the cover is drawn downwardly. The bottom extension of the cover is indicated at 56 and is hinged to the top of the part 22 as indicated at 57. The towel rolls 54 are deposited on the bottom and as the cover is drawn downwardly, they will roll on the cover portion 56 thereof.

An opening 58 will be presented to the operator and through this opening the towels 54 may be extracted. This opening will be closed as the cover is tilted upwardly and returned to its original position by a closure member 61 fixed upon the part 22. This closure 61 may contain the whistle 46 and can extend about the cover and its bottom to a considerable extent. In Fig. 10, the cover is shown drawn outwardly so that the towel rolls are more accessible. With the arrangements as shown in Figs. 8 to 10, there is less chance of the operator receiving serious burns from the steam. The hand will not have to be extended into the path of the steam to any great extent.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A steam sterilizer for towels comprising a plurality of parts stacked one upon the other and including a pedestal, a heater part, a water part and a steam vessel, an opening in the steam vessel through which the towels man be introduced or extracted, a cover adapted to be extended over the opening to retain the steam therewithin, a water inlet pipe extending into the pedestal, then upwardly through the heater part and into the water part to deliver a supply of water thereto, said heater part having a heater element with a supporting base therefor, projections extending from the base and adapted to rest against the interior of the heater part to support the heater and its base therebetween.

2. A steam sterilizer for towels comprising a plurality of parts stacked one upon the other and including a pedestal, a heater part, a water part and a steam vessel, an opening in the steam vessel through which the towels can be introduced or extracted, a cover adapted to be extended over the opening to retain the steam therewithin, a water inlet pipe extending into the pedestal, then upwardly through the heater part and into the water part to deliver a supply of water thereto, said heater part having a heater element with a supporting base therefor, projections extending from the base and adapted to rest against the interior of the heater part to support the heater and its base therebetween, said heater part having an opening therein, a plate extending over the opening, windows in said plate and a switch carried on said plate, electric supply wires extending through the pedestal and into the heater part for connection with the heater and with the switch.

3. A steam sterilizer for towels comprising a plurality of parts stacked one upon the other and including a pedestal, a heater part, a water part and a steam vessel, an opening in the steam vessel through which the towels can be introduced or extracted, a cover adapted to be extended over the opening to retain the steam therewithin, a water inlet pipe extending into the pedestal, then upwardly through the heater part and into the water part to deliver a supply of water thereto, said steam vessel having a closed bottom with an opening therethrough to permit the steam generated in the water part to enter the steam vessel, and a whistle on the top of the steam vessel to indicate a predetermined pressure of the steam within the vessel.

4. A steam sterilizer for towels comprising a plurality of parts stacked one upon the other and including a pedestal, a heater part, a water part and a steam vessel, an opening in the steam vessel through which the towels can be introduced or extracted, a cover adapted to be extended over the opening to retain the steam therewithin, a water inlet pipe extending into the pedestal, then upwardly through the heater part and into the water part to deliver a supply of water thereto, said steam vessel having openings therein through which steam generated in the water part can pass, and means for receiving the towels as they are introduced into the vessel and for moving them about the vessel so that they can be more accessible through the opening thereof.

5. A steam sterilizer for towels comprising a plurality of parts stacked one upon the other and including a pedestal, a heater part, a water part and a steam vessel, an opening in the steam vessel through which the towels can be introduced or extracted, a cover adapted to be extended over the opening to retain the steam therewithin, a water inlet pipe extending into the pedestal, then upwardly through the heater part and into the water part to deliver a supply of water thereto, said steam vessel having openings therein through which steam generated in the water part can pass, means for receiving the towels as they are introduced into the vessel and for moving them about the vessel so that they can be more accessible through the opening thereof, said means for supporting the towels and moving them comprising a shaft rested on the bottom of the vessel and having its upper end rotatively extended through the top thereof, said shaft having a handle by which the same can be turned and a perforated plate at the bottom of the shaft on which the towels may be supported, whereby the towels can be turned from a position more removed from the opening in the vessel to a location where they can be more readily accessible through the opening and to make it unnecessary for the hand of the operator to be extended into the vessel to any great extent.

6. A steam sterilizer for towels comprising a plurality of parts stacked one upon the other and including a pedestal, a heater part, a water part and a steam vessel, for towels, a water inlet pipe extending into the pedestal, then upwardly through the heater part and into the water part to deliver a supply of water thereto, said steam vessel comprising a pivotally mounted cover having an open side for supporting the towels and adapted to be lifted outwardly to move the towels forward within the cover and away from the steam within the vessel, and a fixed closure member part surrounding the open side of the said cover closing the same.

7. A steam sterilizer for towels comprising a plurality of parts stacked one upon the other and including a pedestal, a heater part, a water part and a steam vessel for towels, a water inlet pipe extending into the pedestal, then upwardly through the heater part and into the water part to deliver a supply of water thereto, said steam vessel comprising a pivotally mounted cover having an open side for supporting the towels and adapted to be lifted outwardly to move the towels forward within the cover and away from the steam within the vessel, a fixed closure member surrounding the open side of the cover closing the same, a whistle mounted on said cover, and means on the water part to which the cover is hinged.

8. An article of the class described, comprising a pedestal, a heater rested on said pedestal, a container for water rested on said heater and having an open top, and a steam vessel rested on said container, said container having a flat bottom wall closing the open top of said container, said bottom wall being formed with an opening for the passage of steam from said container to said steam vessel.

MARIE WOEHREL.

REFERENCES CITED

The following references are of record in the file of this patent:

UNITED STATES PATENTS

| Number | Name | Date |
|---|---|---|
| 1,047,668 | Madonna | Dec. 17, 1912 |